April 29, 1958 R. H. EISENGREIN ET AL 2,832,894
AUTOMATIC MACHINE
Filed Oct. 1, 1954 6 Sheets-Sheet 2
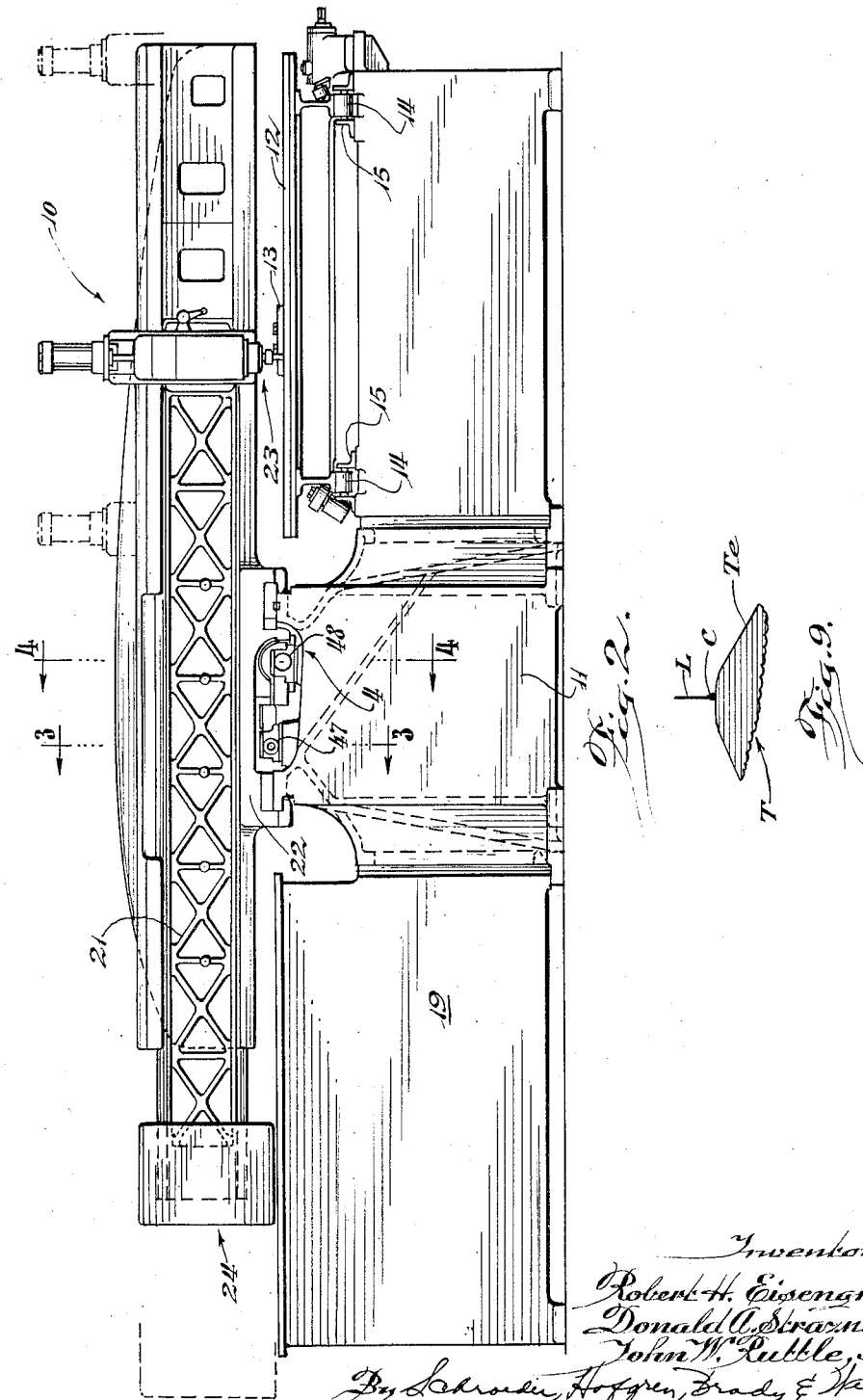
Inventors:
Robert H. Eisengrein
Donald A. Straznickas
John W. Luttle, Jr.
By Schroeder, Hofgren, Brady & Wagner
Attorneys April 29, 1958 R. H. EISENGREIN ET AL 2,832,894
AUTOMATIC MACHINE
Filed Oct. 1, 1954 6 Sheets-Sheet 3
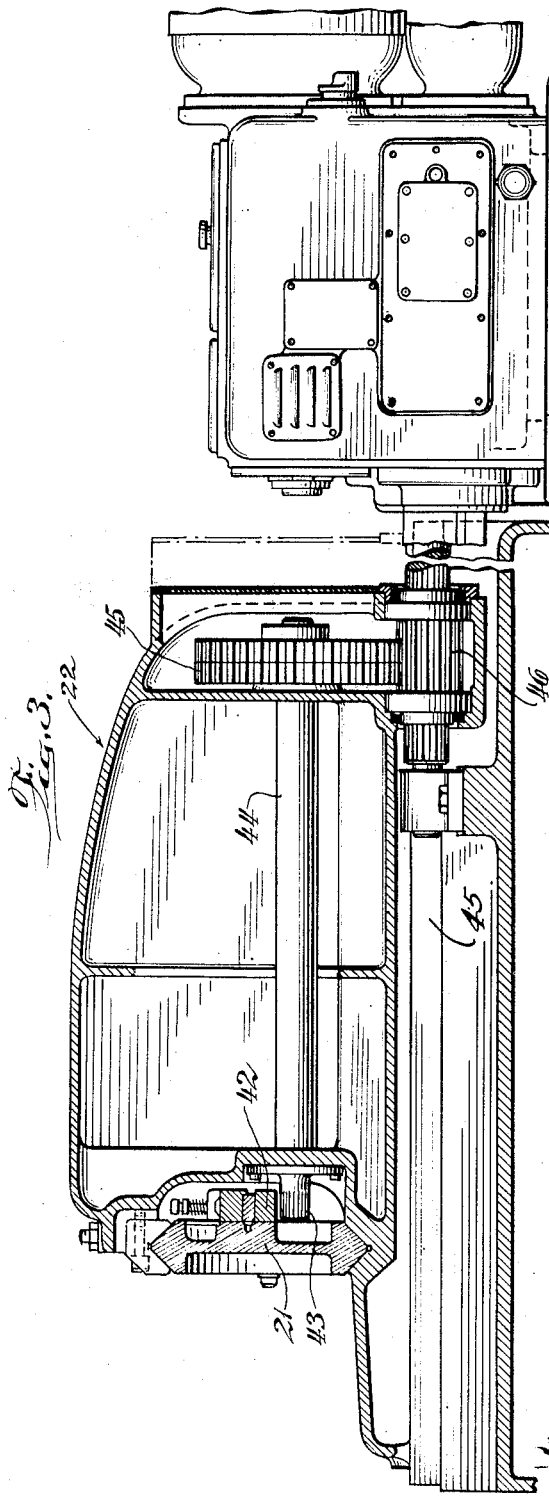
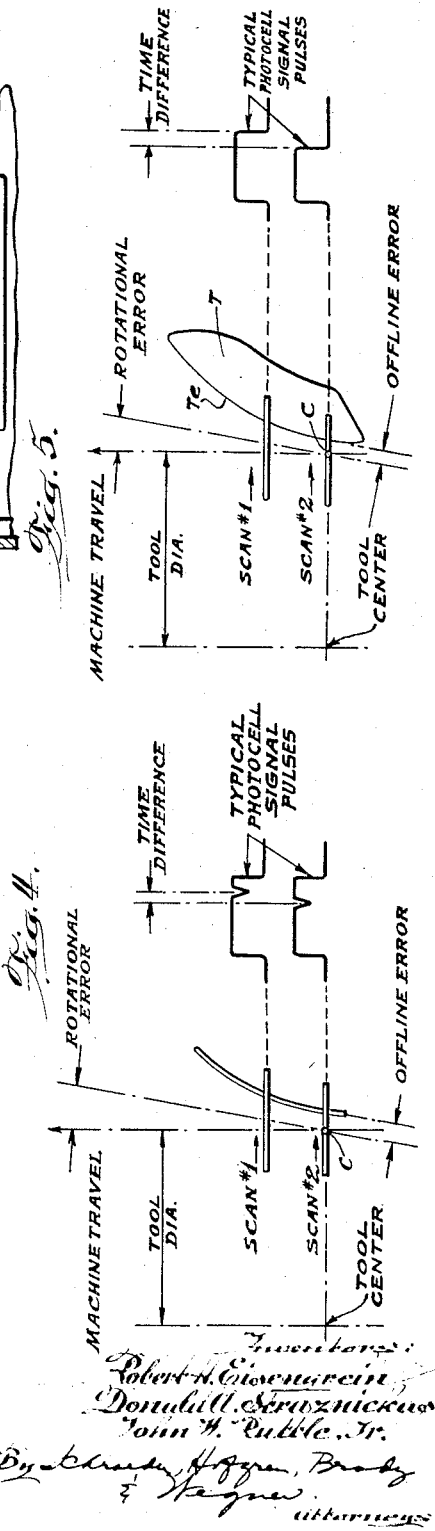

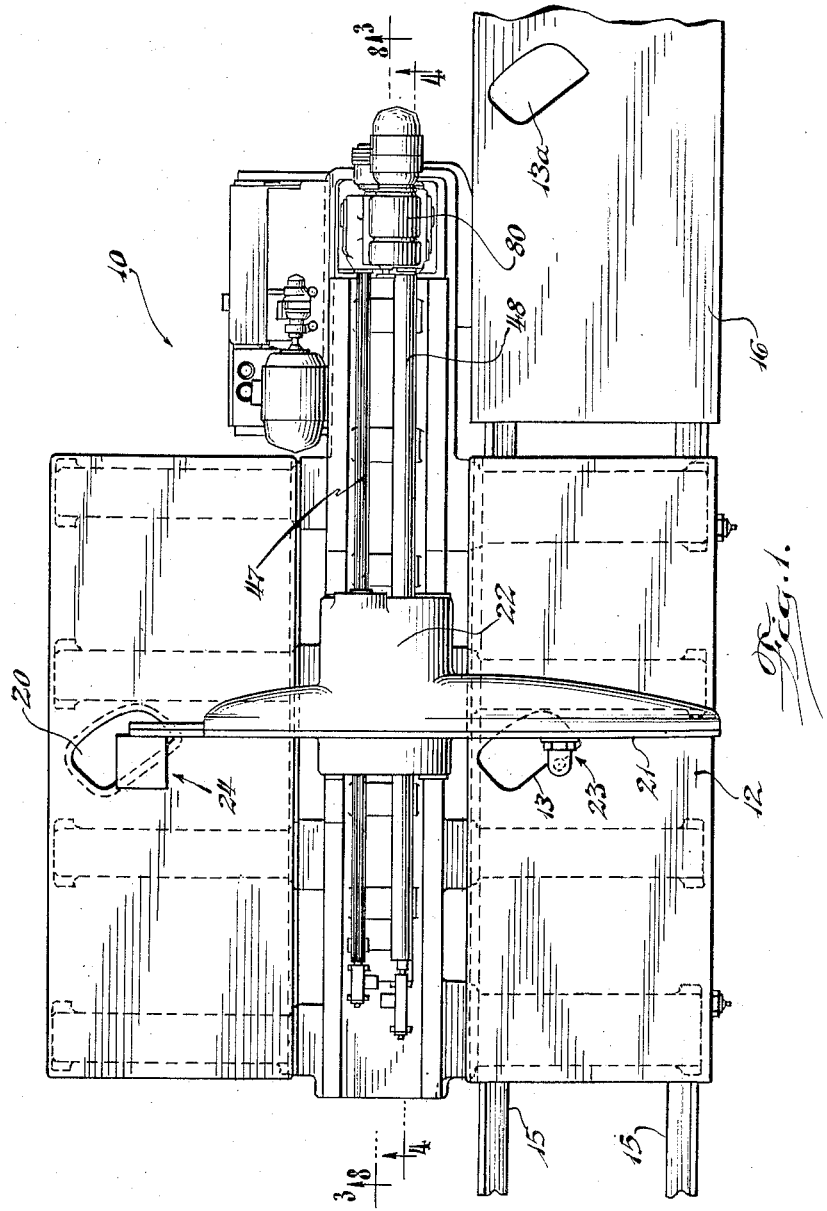

April 29, 1958 R. H. EISENGREIN ET AL 2,832,894
AUTOMATIC MACHINE
Filed Oct. 1, 1954 6 Sheets-Sheet 4

Inventors:
Robert H. Eisengrein
Donald A. Kraznickas
John W. Ruble, Jr.
By Schroeder, Hofgren, Brady & Wegner
Attorneys

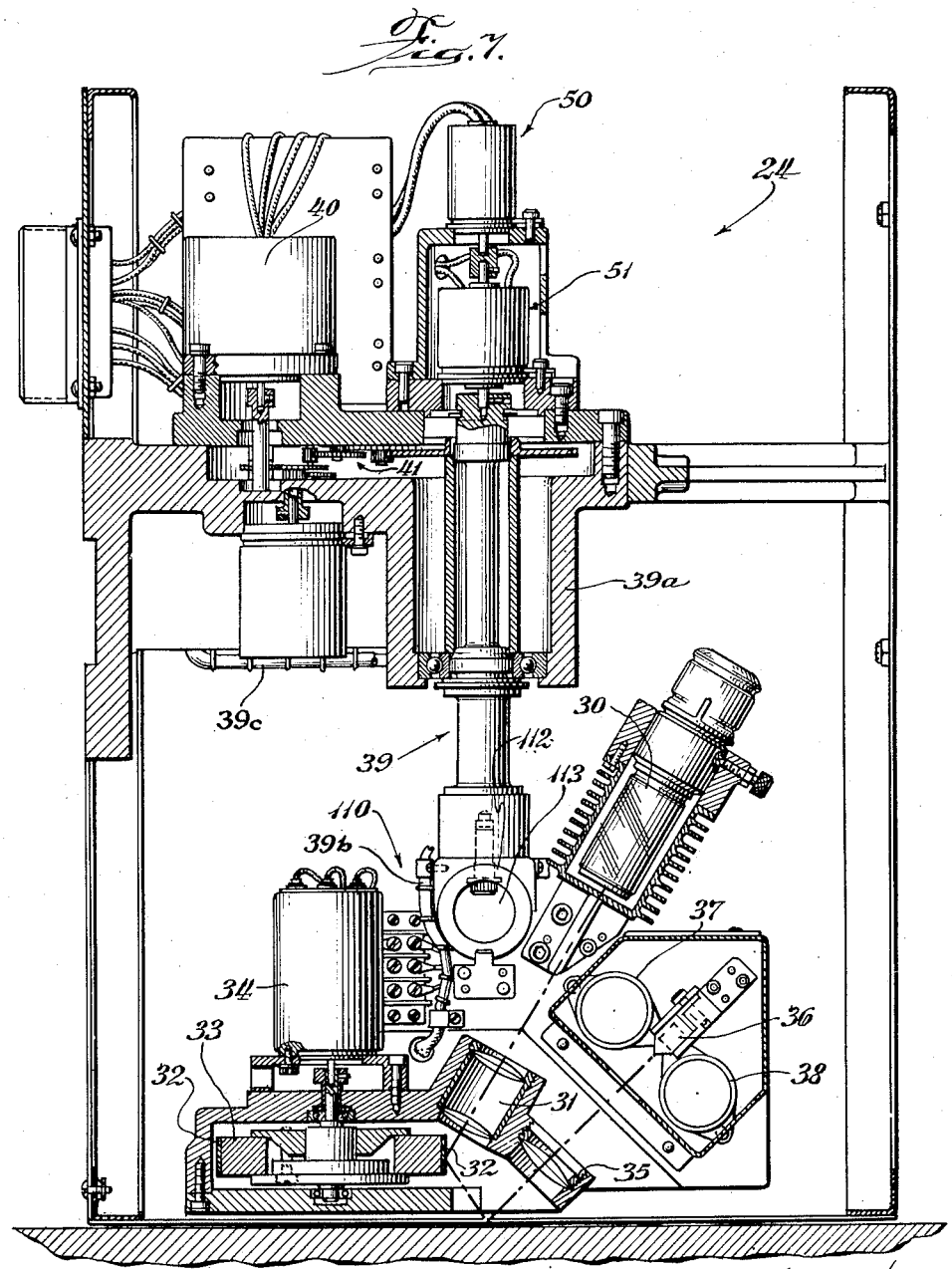

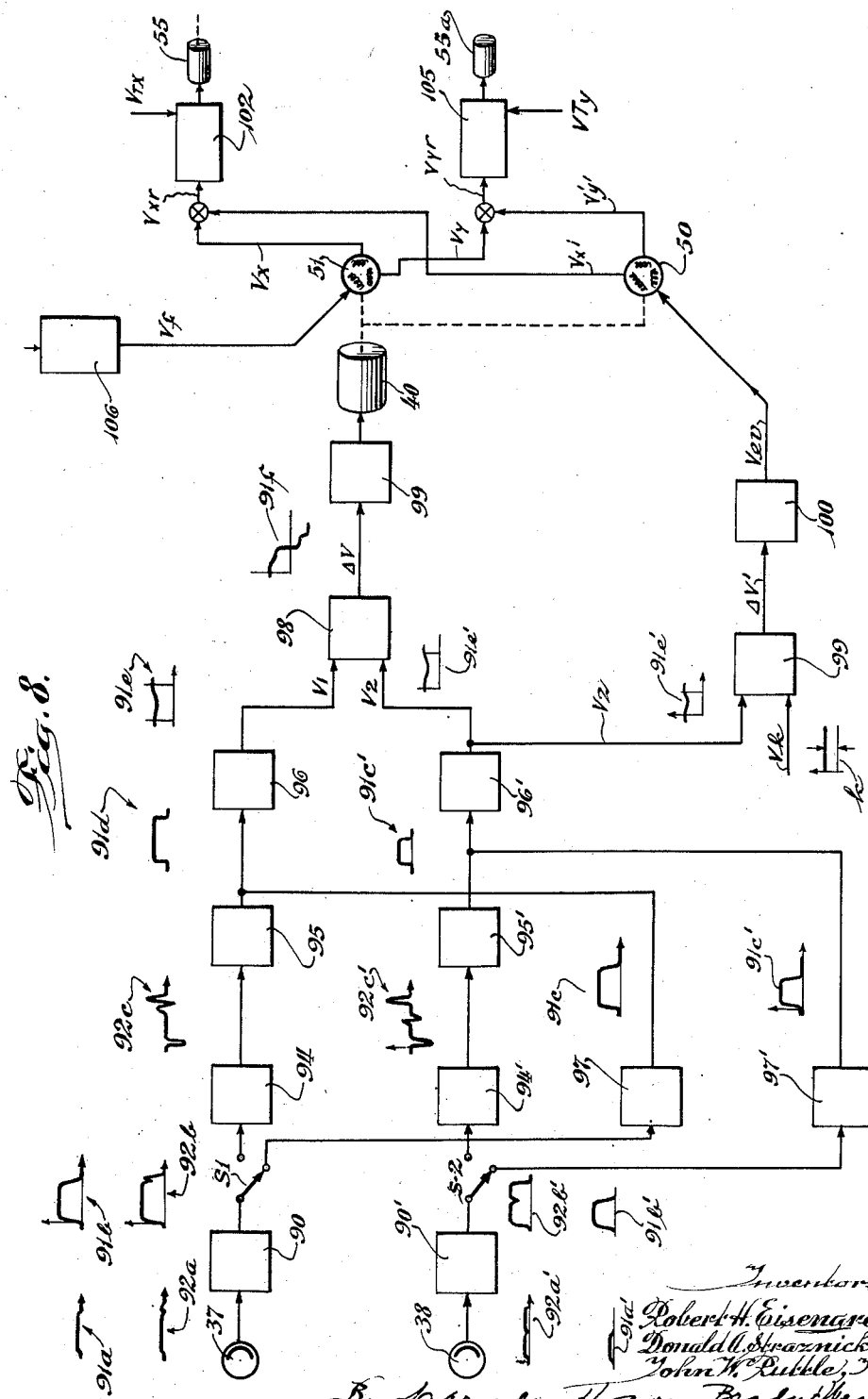

United States Patent Office 2,832,894
Patented Apr. 29, 1958

2,832,894

AUTOMATIC MACHINE

Robert H. Eisengrein and Donald A. Straznickas, Rockford, Ill., and John W. Ruttle, Jr., Glenarm, Md., assignors to Sundstrand Machine Tool Co., Hydraulic Division, a corporation of Illinois Application October 1, 1954, Serial No. 459,612

13 Claims. (Cl. 250—202)

This invention relates to an automatic machine and more particularly to an automatic machine tool and the control mechanism therefor.

It is a general object of the present invention to produce a new and improved automatic machine and control.

It is a more specific object of the invention to produce an automatic machine which is capable of reproducing in a work piece the shape described on a template. According to the present invention the foregoing objects may be secured with various forms of templates, such as a line template, a silhouette template, or a template which is actually a sample part having the shape to be reproduced in the work piece.

An additional object of the present invention is to produce an automatic machine of the type described in the preceding paragraphs wherein a scanning head and a cutting tool are mounted for movement together in two directions, each lying in the same plane, but orthogonally related to each other, together with means for causing the scanning head to follow the contours of the template, thereby causing the cutting tool to follow an identical path thus shaping the work piece to the shape of the template.

Yet another object of the invention is to produce an automatic machine provided with a scanning head having means for producing two parallel spaced light beams directed at a template together with optical and electronic means sensitive to the light reflected at the template by the light beams for maintaining at least one of the beam scans perpendicular to the edge of the template and at a predetermined distance therefrom while simultaneously causing the scanning head to move around the template. A cutting tool is also provided in the machine and so connected to the scanning head as to be movable in an identical path thereby shaping a work piece to the shape of the template.

Other and further objects and advantages of the invention will be readily apparent from the following description and drawings in which:

Fig. 1 is a top plan view of an automatic machine embodying the present invention;

Fig. 2 is a side elevational view of the machine shown in Fig. 1;

Fig. 3 is a sectional view along line 3—3 of Fig. 1 showing a portion of the drive mechanism;

Fig. 4 is a diagrammatic view of the scan and photocell pulses arising therefrom where a line template is used;

Fig. 5 is a view like Fig. 4, but showing the use of a silhouette template;

Fig. 7 is a vertical sectional view through the scanning head of the machine;

Fig. 8 is a block diagram of the control circuit; and

Fig. 9 is a diagrammatic view showing a single light scan and a portion of a template edge for purpose of illustrating the principle of the scanning control.

Figure 6:
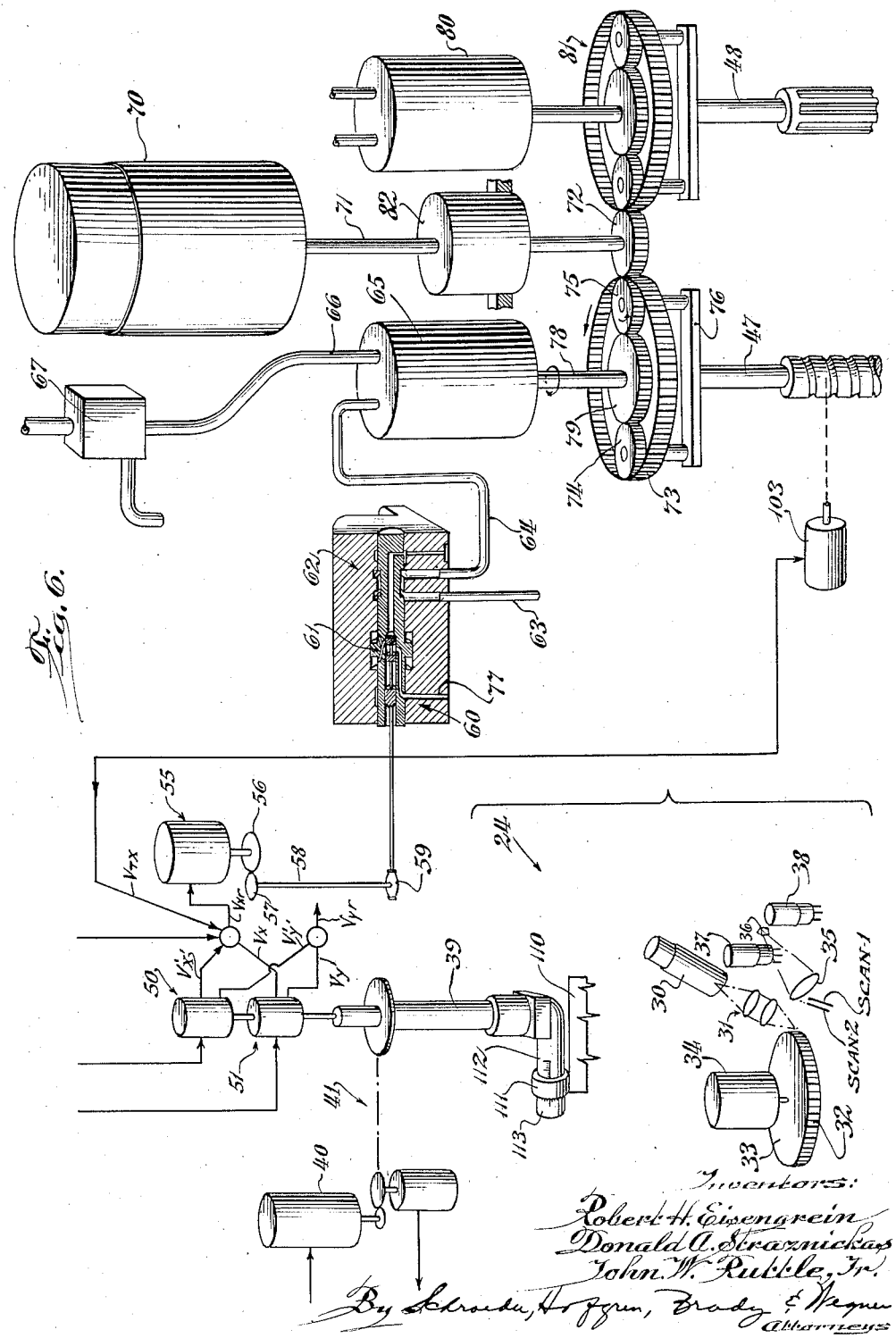
Fig. 6 is a schematic view of the optical system and drive control means for driving the machine.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

General description of the machine

For the purpose of exemplary disclosure the present invention is shown as embodied in a profile routing machine, although it will be readily apparent to those skilled in the art that the principle of the invention and the control may be utilized with advantage in other forms of automatic machines. As shown in Figs. 1 and 2, the profile router 10 comprises a bed 11 having thereon a work table 12 for supporting a work piece 13 with the table 12 being mounted on rollers 14 movable in tracks 15 extending along the bed of the machine. A second work table 16 is also provided with rollers rolling in the track 15 and may be used to support additional work pieces 13a. While the machine is operating on the work piece 13 mounted on the table 12, a finished work piece 13a may be removed from the table 16 and a blank positioned in place thereof. Upon completion of the work piece 13, the table 12 may be rolled to one side and the table 16 rolled into working position, thus permitting rapid change of work piece blanks and the removal of finished work pieces and the positioning of work piece blanks without interrupting the cutting cycle of the machine.

A template table 17 is also mounted on the bed and adapted to support a template 20 which, as previously noted, may be a line drawing, a silhouette drawing or another work piece. A trussed beam 21 extends across the bed 11 and is movable longitudinally of its length (in a direction hereinafter sometimes referred to as along the Y axis) on a carriage 22 movable on the bed in a direction transverse to the extent of the beam 21 (along an axis hereinafter sometimes referred to as the X axis). The beam 21 carries at one end a cutting tool 23 and at its other end a scanning head 24. As both the scanning head and cutting tool are mounted on the beam 21, they are mounted for movement together along both the X and Y axes previously mentioned.

Referring now to Figs. 6 and 7, it will be noted that the scanning head 24 includes a light source 30 for directing light at a condensing lens system 31 which concentrates the light on a plurality of mirrors 32, each mounted on a rotatable disc 33. In the embodiment shown, thirty-two mirrors 32 are provided, which mirrors are mounted as to reflect the light to form two scan lines. For this purpose, sixteen alternate mirrors are mounted on equal radii of the disc 33 while intermediate sixteen mirrors are mounted on equal but different radii of the disc 33.

The disc 33 is rotated, preferably at about 8,000 revolutions per minute by a motor 34 carried in the scanning head 24. The two beams of light reflected from the mirror surfaces form scan 1 and scan 2 and both scans are directed at the edge of a template as illustrated in Figs. 4 and 5. The light reflected from the template background passes through a focusing lens system 35 which directs the light to a right angle prism 36 which deflects the beams, sending the light from scan 1 to a phototube 37 and from scan 2 to a phototube 38. Information derived from the two scans is utilized to maintain the scans substantially at right angles to the edge of the template and to keep the scanning head a predetermined distance from the edge of the template.

Before further describing the principle on which the control operates, it should be noted that the portions of the optical and electrical system 30—38, just described, are rotatable about a vertical axis. For this purpose such parts are carried by a shaft 39 mounted for rotation in a housing portion 39a of the scanning head. Electrical impulses are carried between the multi-wire conduit 39b and a multi-wire conduit 39c by a suitable slip ring and brush holder assembly (not shown) carried by the shaft 39. A motor 40 is connected by means of a gear train 41 to the shaft 39 and is operable to rotate the shaft and hence the optical and light source assembly to effect control of the machine.

Movement of the beam 21 longitudinally of its length (Y axis movement) is provided by the means illustrated in Figs. 2 and 3 and includes a rack 42 secured to the beam 21 and meshing with a pinion 43 formed on the end of a shaft 44, the other end of which carries a split gear 45 meshing with a second gear 46 carried by a splined shaft 47 mounted in the frame and driven by means hereafter to be described. The drive for the carriage (X axis movement) is through a ball bearing type nut and lead screw enclosed in a telescoping shaft 48 with the nut engaging a suitable means on the carriage 22 for moving the carriage. The shaft 48 is driven by other drive means to be described.

General description of the control

For the purpose of describing the control and the basis on which it operates, reference may be had to Fig. 9 wherein is shown a template T having an edge $T_e$ against which is directed a scan line L. C is a reference point on the line L. If we maintain the point C on the edge of the template and the line L perpendicular to the template edge $T_e$ at the point C, sufficient information may be derived to effect automatic control of the machine.

Describing the operations first with a silhouette template and referring specifically to Fig. 5, part of the light from the scans 1 and 2 will be reflected to the phototubes 37 and 38 and part will be reflected but at a reduced magnitude because of the black template area. The phototubes will therefore generate a pulse, the width of which varies according to the time that elapses between the start of the light scan and when it first strikes the edge. Since the scans have a constant and known velocity, the times are proportional to distance and pulse width. With the conditions as shown in Fig. 5, it will be seen that the pulse from scan 1 is wider than the pulse from scan 2 since more of scan 1 is reflected from the white background area. It can also be seen that point C is not on the edge of the template. This situation reflects a general case of system error, that is, both rotational error since the line is not perpendicular to the template edge and off-line error since point C is not on the template edge. From this situation information is obtained to provide signals to correct both the rotational and off-line errors existing.

To correct for rotational errors i. e. to provide a signal for energizing the motor 40 to rotate the optical portion of the scanning head so as to make scan 2 perpendicular to the template edge, the two pulse areas are measured by integration and D. C. voltages $V_1$ and $V_2$ are obtained, which voltages are proportional to the pulse areas of scans 1 and 2 respectively. For the case shown in Fig. 5, $V_1$ is greater than $V_2$. This indicates template curvature as shown and requires clockwise rotation of the shaft 39 to rotate the optical assembly and scan 2 to a position where the latter is perpendicular to the template edge. The rate of correction required is determined by the magnitude of the voltage, $\Delta V$, where $\Delta V = V_1 - V_2$. The polarity of $\Delta V$; that is, whether $V_1$ is greater or less than $V_2$, determines the direction of template curvature or rotational error and, therefore, whether clockwise or counterclockwise rotation of the optical assembly is required. $\Delta V$ is amplified and converted to an A. C. signal, by the electrical system hereinafter to be described in greater detail, wherein the signal has a magnitude proportional to $\Delta V$ and a phase determined by the polarity of $\Delta V$. This A. C. signal voltage is applied to the two phase motor 40 which is thereupon caused to rotate clockwise or counterclockwise, depending on the phase of $\Delta V$, to turn the optical assembly and thus maintain the scan perpendicular to the template edge.

To correct for off-line error, that is, to move the point C on scan 2 to a position adjacent the template edge, only scan 2 is needed. As previously described, scan 2 produces a pulse which in turn is used to provide a voltage $V_2$, proportional to the width of the pulse. This voltage $V_2$ is, by the electrical system to be described, compared to a constant potential $V_k$ which equals $V_2$ when point C is on the edge of the template. For positions of point C to the right or left of the template edge, the difference voltage $\Delta V'$ (where $\Delta V' = V_k - V_2$) becomes positive or negative. The magnitude and polarity of $\Delta V'$ are used to cause corrective motion of the appropriate X and Y axis machine drives to position point C on the template edge.

From the foregoing it can be seen that scans 1 and 2 provide the necessary voltages to:

(1) Cause the scanning motor head 40 to rotate clockwise or counterclockwise depending upon the polarity and magnitude of $\Delta V$, thus causing line L (scan 2) to become perpendicular to the template edge, and (2) Decrease the off-line error to zero.

To close the link between the information coming from the scanner head assembly and the X and Y axis drives, a pair of resolvers are used; namely, a sliding resolver 50 and a rotational resolver 51. Resolvers, as is known, have the property of providing two output voltages proportional to an excitation voltage $V_e$ and the sine and co-sine of the rotor angle $\theta$ with respect to a reference position. Thus $V_{r1} = V_e \sin \theta = V_x$ and $V_{r2} = V_e \cos \theta = V_y$.

The rotors of both resolvers are connected to the shaft 39 and thus are rotated therewith while the stators may be adjusted to have $\theta$ equal 0 for any reference position. In the device shown, excitation of the rotational resolver 51, $V_f$, is a constant A. C. voltage, the magnitude of which determines the maximum tracing rate for the system. The excitation of the slider resolver 50, $V_{ev}$, is proportional to $\Delta V'$ and its phase reverses 180° as the polarity of $\Delta V'$ reverses.

The outputs of the resolvers are used to provide a signal correctly to drive the X or Y axis drives to follow the curvature of the template. Assuming machine travel along a straight template line in the direction of the X axis, $V_y$ must equal 0 and $V_x$ equal the signal for the maximum tracing rate. As the curvature of the template changes and $\Delta V$ equals some finite value, motor 40 causes the scanning head optical assembly 24 to rotate to maintain scan 2 perpendicular to the template edge. Rotation of the motor 40 causes rotation of the rotational resolver, thus changing $\theta$, decreasing $V_x$ and increasing $V_y$. The Y axis drive is now caused to respond, thereby moving the cutting tool and entire scanning head assembly along both axes and point C will remain on the edge of the template. If the scan lines were moving along an edge of the template at right angles to the edge $T_e$ shown, the opposite extreme case would exist and $\theta$ would equal 90°, $V_x$ would equal 0 and $V_y$ would equal the signal for maximum Y axis motion. For the intermediate case we have a condition where $\theta$ is greater than 0, but less than 90° and thus both $V_x$ and $V_y$ signals give the machine the combined X and Y axis motion to move point C along the template edge.

Since the machine drive mechanism cannot respond instantaneously to the correcting signals $V_x$ and $V_y$ (and normal forces may cause shift off of exact path), some off-line error will exist as the template curvature changes. Depending upon the direction (as related to the X axis and Y axis of the machine) of the template edge, the off-line error will be corrected by Y axis motion, X axis motion or a combination of motions on both axes.

The signal to correct for off-line error is derived from the slider resolver 50. The output voltages of the slider resolver;

$$V_{s1}=V_{ev} \sin \phi = V_{ev} \sin (\theta+90°)=V_{x'}$$
$$V_{s2}=V_{ev} \cos \phi = V_{ev} \cos (\theta+90°)=V_{y'}$$

Inasmuch as off-line error, that is, positions of point C away from the edge of the template, will be at right angles to the edges of the template, angle $\phi$ is, of course, 90° offset from angle $\theta$.

The manner for providing an X axis drive velocity to be proportional to $V_{xr}$ (where $V_{xr}$ equals $V_x+V_{x'}$) are best shown in Fig. 6. If a signal $V_{xr}$ is generated, it causes a control valve motor 55 to rotate at a velocity proportional to the voltage of $V_{xr}$. The motor 55 is connected through gears 56 and 57 and shaft 58 to a cam 59. Rotation of the shaft 58 and thus the cam 59 causes operation of a pilot valve 60 to introduce oil under pressure into the cylinder containing a power piston 61 operating a control valve 62; and fluid under pressure entering the control valve 62 through a line 63 is directed into a line 64 from which it passes into a hydraulic motor 65. Exhaust from the motor is through the line 66 and back pressure valve 67. A synchronous motor 70 is driven at at a predetermined speed, rotating a shaft 71 and a gear 72 carried thereon. The spur gear 72 meshes with an internally and externally toothed ring gear 73, the internal teeth of which mesh with a pair of planet gears 74 and 75 rotatably carried on a spider 76 fixed to the drive shaft 47 for the Y axis drive. The hydraulic motor 65 rotates a shaft 78 carrying a sun gear 79 thereon which meshes with the two planet gears 74 and 75. If the hydraulic motor 65 rotates at a predetermined speed relative to the speed of the synchronous motor, no motion of the spider 76 (and hence no motion of the drive shaft 47) will occur. If, however, the motor 65 is driven at a speed higher or lower than said predetermined speed, the shaft 47 will be caused to rotate either counterclockwise or clockwise. Thus reversal of the direction of rotation of the shaft 47 may take place without reversing either of the motors 65 or 70.

Oil under pressure is directed to the pilot valve 60 through a passage 77 and, as controlled by the pilot valve, is directed into the cylinder containing the power piston 61, thereby shifting the control valve 62. The control valve throttles the ports, thereby controlling the flow of fluid from the passage 63 into the passage 64. A similar control valve, pilot valve and control valve motor system are used to control the speed and direction of the X axis drive shaft 48 through the hydraulic motor 80 and planetary system 81 shown in Fig. 6. As the parts just mentioned are duplicates of those described with reference to the X axis drive, they have not been shown in detail in the drawings.

To permit rapid traverse of the machine drives durnig the operation of shifting from one template to another or other junctions incident with noncutting operations of the machine, a power clutch brake 82 is provided for the synchronous motor shaft 71 and means are provided for operating the brake to halt rotation of the shaft 71 while applying maximum fluid through the hydraulic motor 65 and 70, thereby achieving maximum rotational speeds of the drive shafts 47 and 48.

*Electrical circuit*

Referring now to Figure 8, the general electrical circuit for controlling the system just described will be explained. It will be noted that there is shown the phototubes 37 and 38 with the tube 37 serving to generate the pulses 91a or 92a, depending upon whether a silhouette template or a line template is used, and the tube 38 generating pulses 91a' and 92a', both in response to the reflected scans. The pulses produced by phototubes 37 and 38, and corresponding to scans 1 and 2, are amplified by amplifiers 90 and 90', the amplified pulses being illustrated diagrammatically as 91b, 91b', 92b and 92b'. The intermediate pulse portion (or "blip") of the signals derived from a line template indicates the length of the scans. Switches $S_1$ and $S_2$ are provided for connecting the output of the amplifiers 90 and 90' selectively to a first or second circuit, depending upon the type of template being used.

When a silhouette template is used, the switches $S_1$ and $S_2$ will be in the position shown in the drawing and the generally rectangular pulses 91b and 91b' appearing in the output of amplifiers 90 and 90' will be further amplified by pulse amplifiers 97 and 97', the amplified output thereof appearing as rectangular pulses 91c and 91c' respectively.

When a line template is being used, switches $S_1$ and $S_2$ are shifted to the opposite position from that in which they are shown, the output of amplifiers 90 and 90' being coupled to differentiator circuits 94 and 94' respectively. The differentiated pulses have wave forms as shown at 92c and 92c' and are used to trigger "on-off" multivibrators 95 and 95' which produce rectangular pulses 91d and 91d' having widths corresponding to the position of the intermediate pulses (or "blips") in the outputs of the phototubes and therefore corresponding to the length of the scans 1 and 2.

Thus, whether a silhouette or a line template is used to guide the operation of the machine, rectangular pulses 91d and 91d' having widths corresponding to the length of the scans are provided. These pulses, which have a repetition rate of the order of 2000 C. P. S., are averaged over a relatively long period of time by integrator circuits 96 and 97 to produce variable amplitude, D. C. control voltages $V_1$ and $V_2$, as shown at 91e and 91e'. The voltages $V_1$ and $V_2$ are algebraically compared by a balanced circuit 98 with the difference voltage, $\Delta V$ appearing in the output, the voltage $\Delta V$ varying in amplitude and polarity according to the relationship between the voltages $V_1$ and $V_2$, as shown at 91f. The polarity of the voltage $\Delta V$ indicates which of the scans, 1 or 2, is longer and the amplitude thereof indicates the amount of difference in the scan lengths. The voltage $\Delta V$ is utilized to control the operation of a modulator and power amplifier system 99. The output of the modulator power amplifier 99 is an A. C. voltage, the phase of which is determined by the polarity of the voltage $\Delta V$ and the amplitude of which is determined by the amplitude of the voltage $\Delta V$; the phase of this A. C. voltage is changed by 180° with changes in the polarity of $\Delta V$. The A. C. voltage just described energizes two-phase scanner motor 40 which rotates the scanner head to equalize the length of the two scans, 1 and 2. The direction of rotation of the scanner motor 40 is determined by the phase of the A. C. voltage applied thereto and thus by the polarity of the control voltage $\Delta V$.

As previously discussed, the rotor of rotational resolver 51 is coupled to scanner motor 40 and is rotated thereby. An A. C. rate of feed control voltage, $V_f$, which is provided by rate of feed generator 106, is coupled to the rotor winding of rotational resolver 51 and therein resolved into its axial components $V_x$ and $V_y$.

In order to maintain the scanner head a fixed distance away from the template edge, that is, to maintain point C on the edge of the template, a portion of voltage $V_2$ is coupled to a balanced comparison circuit 99 in which it is compared with a reference potential $V_k$ which may have a constant value as shown at $k$. If the point C is on the edge of the template, the voltage $V_2$ equals the voltage $V_k$ and circuit 99 has no output. If, however, the point C should be on either side of the template edge, the difference between the voltage $V_2$ and voltage $V_k$, $\Delta V'$, as shown at 99a, appears in the output of circuit 99. The polarity of the voltage $\Delta V'$ indicates the direction which C is spaced from the edge of the template while the amplitude thereof indicates the amount of positional error.

Voltage $\Delta V'$ controls the operation of the slider modulator and amplifier 100 which produces an A. C. voltage, $V_{ev}$, the phase and amplitude of which are determined by the polarity and amplitude of the voltage $\Delta V'$, respectively. A. C. voltage $V_{ev}$ is connected to the rotor winding of slider resolver 50, the position of which is determined by the position of scanner motor 40. The windings of slider resolver 50 are displaced 90° from the windings of rotational resolver 51. The movement of the drive means resulting from the voltage $\Delta V'$ is in a direction at right angles to the edge of the template rather than parallel thereto as is the movement due to rate of feed control voltage $V_f$. Voltage $V_{ev}$ is broken into its axial components $V_{x'}$ and $V_{y'}$ by the heretofore described action of slider resolver 50. The two X axis control voltages, $V_x$ and $V_{x'}$, are algebraically added to provide a resultant X axis control voltage $V_{xr}$ which controls the operation of X axis valve motor power amplifier 102. Similarly, the Y axis control voltages $V_y$ and $V_{y'}$ are algebraically added to provide a resultant Y axis control voltage $V_{yr}$ which controls the operation of Y axis valve motor amplifier 105.

In order to stabilize the machine, it is necessary to provide a feedback in the control system. To the X axis drive shaft 47 is coupled a tachometer 103 producing a tachometer voltage $V_{tx}$ proportional to the speed of rotation of the shaft 47 and this voltage $V_{tx}$ is fed back to the amplifier 102 in opposition to the signal $V_{xr}$. Similarly, a tachometer is connected to the Y output shaft 48 to generate and feedback a voltage $V_{ty}$ into the amplifier 105 in opposition to the signal $V_{yr}$. Resolver voltage $V_{xr}$ is proportional to the desired velocity in the X direction. If this voltage is directly applied to control valve motor the valve will continue to move thus giving a rate of change of velocity or then an acceleration. To give a constant velocity the resolver voltage $V_{xr}$ must be nullified when proper out velocity is attained. This is the reason for the tachometer voltage $V_{tx}$.

The vertical axis of the shaft 39 which supports the mirror and optical assembly will, because of the foregoing controls, follow a path around the edge of the template which is identical with the path of the axis of the cutting tool around the edge of the work piece. Inasmuch as the cutting tool possesses a diameter, if the scan lines produced by the optical assembly were directly beneath the shaft 39, the cutting tool would cut a work piece to a shape differing in diameter from the template by a distance equal to the radius of the cutting tool. Accordingly means are provided for offsetting the optical assembly from the axis of the shaft 39. For this purpose the optical assembly is carried by a member 110 which is slidably mounted on a fixed guide bar 112. A micrometer knob 113 is rotatable to move the member 110 along the guide bar 112 and thus to shift the optical assembly laterally to one side of the axis of the shaft 39. By shifting the optical assembly laterally to the shaft 39, a distance equal to one half the diameter of the tool, the tool thereupon will cut the work piece into a shape corresponding precisely with the shape of the template.

We claim:

1. In a machine having means for supporting a work piece and a cutter, automatic control means comprising means for supporting a template, means for scanning said template, a first drive means for moving the cutter and scanning means together along an axis X, a second drive means for moving the scanning means and the cutter together along an axis Y at a predetermined angle to and in the same plane as axis X, means for maintaining said scanning means in predetermined angular relation to said template, means for generating a feed control signal, means responsive to the angular position of said scanning means for resolving said feed control signal into axial components, $V_x$ and $V_y$, means for providing a second signal as a function of the deviation of the distance between said scanning means and said template from a predetermined distance, means responsive to the position of said scanning means for resolving said deviation signal into axial components, $V_{x'}$ and $V_{y'}$, means for operating the X axis drive means in accordance with signals $V_x$ and $V_{x'}$, and means for operating the Y axis drive means in accordance with the signals $V_y$ and $V_{y'}$.

2. In a machine having a cutter, automatic control means comprising means for supporting a template on the machine, means for generating a pair of spaced light scans directed at an edge of the template, a first drive means for moving the generating means and the cutter together along an axis X, second drive means for moving the generating means and the cutter together along an axis Y at right angles to and in the same plane as axis X, means for generating a signal corresponding in character to the length of each of said scans, means responsive to differences between said length signals to rotate said scan generating means in a direction equalizing said scan lengths, means for generating a feed control signal, means responsive to the rotational position of said scan generating means and to said feed control signal to provide an X axis signal, $V_x$, and a Y axis signal, $V_y$, means for providing a reference potential, means for comparing the reference potential with the length signal of one of said scans and for generating another signal in response to differences therebetween, means for generating an X axis signal, $V_{x'}$, and a Y axis signal, $V_{y'}$, from said other signal, means for operating the X axis drive means in accordance with signals $V_x$ and $V_{x'}$, and means for operating the Y axis drive means in accordance with said signals $V_y$ and $V_{y'}$.

3. In a machine having a cutter, automatic control means comprising means for supporting a template on the machine, means for generating a pair of spaced light scans directed at an edge of the template, a first drive means for moving the generating means and the cutter together along an axis X, second drive means for moving the generating means and the cutter together along an axis Y at right angles to and in the same plane as axis X, means for generating a signal corresponding in character to the length of each of said scans, means responsive to differences between said length signals to rotate said scan generating means in a direction equalizing said scan lengths, means for generating a feed control signal, a rotational resolver connected to be rotated with said scan generating means and responsive to said feed control signal to provide an X axis signal $V_x$ and a Y axis signal $V_y$, means for providing a reference potential, means for comparing the reference potential with the length signal of one of said scans and for generating another signal in response to differences therebetween, a slider resolver for generating an X axis signal $V_{x'}$ and a Y axis signal $V_{y'}$ from said other signal, means for operating the X axis drive means in accordance with the algebraic sum of said signals $V_x$ and $V_{x'}$, and means for operating the Y axis drive means in accordance with the algebraic sum of said signals $V_y$ and $V_{y'}$.

4. In a machine having a bed; a carriage movable forwardly and reversely on the bed along an axis X; a support member carried by carriage and movable along an axis Y at right angles to the axis X; and a cutter carried at one end of the support member; automatic control means comprising a scanning head rotatably mounted at the other end of the support means; drive means for moving the carriage along said X axis; drive means for moving the support member along said Y axis; means for securing a work piece to the bed adjacent said one end of the support; means for supporting a template adjacent said other end of the support; means on said scanning head for generating a pair of spaced parallel light scans directed at one edge of the template and generally at right angles thereto; means for maintaining said light scans perpendicular to said template edge including means sensitive to said light scans and operable to generate a pair of signals each corresponding in character to the length of one of said scans, means responsive to differences between said length signals to rotate said scanning head in a direction equalizing said scan lengths; means for generating a feed rate control signal; a rotational resolver mounted on said scanning head and rotated therewith, said resolver being operable to provide an X axis signal $V_x$ and a Y axis signal $V_y$ in accordance with the rotational position of said scanning head and said feed rate control signal, means for providing a reference potential, means for comparing the reference potential with the length signal of one of said scans and for generating another signal in response to differences therebetween, a slider resolver mounted on said scanning head and rotated therewith for generating an X axis signal $V_{x'}$ and a Y axis signal $V_{y'}$ from said other signal, means for operating the X axis drive means in accordance with the algebraic sum of said signals $V_x$ and $V_{x'}$, and means for operating the Y axis drive means in accordance with the algebraic sum of said signals $V_y$ and $V_{y'}$.

5. In a machine having a cutter, automatic control means comprising means for supporting a template on the machine, a scanning head rotatably mounted on the machine, a first drive means for moving the scanning head and the cutter together along an axis X, second drive means for moving the scanning head and the cutter together along a second axis Y at right angles to and in the same plane as axis X; means on said scanning head for generating a pair of spaced parallel light scans directed at one edge of the template and generally at right angles thereto; means for maintaining said light scans perpendicular to said template edge including means sensitive to said light scans and operable to generate a pair of signals each corresponding in character to the length to one of said scans, means responsive to differences between said length signals to rotate said scanning head in a direction equalizing said scan lengths; means for generating a feed rate control signal; a rotational resolver mounted on said scanning head and rotated therewith, said resolver being operable to provide and X axis signal $V_x$ and a Y axis signal $V_y$ in accordance with the rotational position of said scanning head and said feed rate control signal, means for providing a reference potential, means for comparing the reference potential with the length signal of one of said scans and for generating another signal in response to differences therebetween, a slider resolver mounted on said scanning head and rotated therewith for generating an X axis signal $V_{x'}$ and a Y axis signal $V_{y'}$ from said other signal, means for operating the X axis drive means in accordance with the algebraic sum of said signals $V_x$ and $V_{x'}$, and means for operating the Y axis drive means in accordance with the algebraic sum of said signals $V_y$ and $V_{y'}$.

6. The automatic control of claim 5 including signal generating means driven by one of said axis drive means, and means for transmitting a signal generated by the last named generating means to and applying it in opposition to the algebraic sum of said axis control signals.

7. The automatic control of claim 5 in which said means for generating said light scans includes a rotatably mounted disc, a plurality of mirrors around the circumference of the disc with alternate mirrors lying on equal radii of the disc and with intermediate mirrors lying on equal radii but different than the radii of the alternate mirrors, a source of light directed at said mirrors, and means for rotating the disc.

8. The automatic control of claim 5 including means for shifting the scan generating means to affect the scans a distance equal to the radius of the cutter.

9. In a method for operating a template controlled machine tool having a movable scanning head, the steps which comprise generating a pair of spaced parallel scan lines and directing said lines at the edge of the template, measuring the length of each scan line to the point where it crosses the edge of the template, utilizing a difference in the length of said lines to move the scanning head in a direction equalizing said line length and utilizing the position of the scanning head to control a movement of the machine.

10. The method of claim 9 including the steps of comparing said length of one of said lines with a desired length and utilizing a difference between the last mentioned two lengths to control another movement of the machine.

11. The method for automatically controlling the movement in two angularly related directions of a tool in an automatic machine having a movable scanning head, the steps which comprise generating a pair of parallel and spaced light scans and directing said scans at the edge of a template, measuring the length of each of said scans to the point where it crosses the edge of the template, rotating the scanning head as a result of differences in the last mentioned lengths in a direction equalizing said lengths, thereby maintaining said lines perpendicular to said template edge, comparing the said length of one of said lines with a desired value, generating a signal as a function of the position of said scanning head, generating a second signal as a result of differences between said length and said value and combining said signals to move said tool in said directions.

12. In a machine having a cutter, automatic control means comprising means for supporting a template on the machine, means for generating a pair of spaced light scans directed at an edge of the template, a first drive means for moving the generating means and the cutter together along an axis X, second drive means for moving the generating means and the cutter together along an axis Y at right angles to and in the same plane as axis X, means, including a photoelectric cell associated with each of said scans, for generating signals having a duration comparable to said scan distances, means for averaging said signals over a relatively long period, means for comparing the average signals from both of said scans and for deriving therefrom a difference signal, the polarity and amplitude of said difference signal indicating respectively which of said traces is longer and the amount of difference in the trace length, motor means responsive to said difference signal for rotating said scan generating means in a direction to equalize the length of said scans, means for generating a feed control signal, means responsive to the rotational position of said scan generating means and to said feed control signal to provide an X axis signal, $V_x$, and a Y axis signal, $V_y$, means for providing a reference potential, means for comparing the reference potential with the length signal of one of said scans and for generating another signal in response to differences therebetween, means for generating an X axis signal $V_{x'}$ and a Y axis signal $V_{y'}$ from said other signal, means for operating the X axis drive means in accordance with signals $V_x$ and $V_{x'}$, and means for operating the Y axis drive means in accordance with signals $V_y$ and $V_{y'}$.

13. In a machine having a cutter, automatic control means comprising means for supporting a line template on the machine, means for generating a pair of spaced line scans directed at an edge of the template, a first drive means for moving the generating means and the cutter together along an axis X, second drive means for moving the generating means and the cutter together along the axis Y at right angles to and in the same plane as axis X, means for generating a signal having a pulse therein corresponding in position to the distance of each of said scans from said line template, means for differentiating said signals, multivibrator means controlled by said differentiated signals for producing different signals having a time duration corresponding to the position of said pulse, means for integrating said signals over a relatively long period to provide potentials having the value corresponding to the average value of said last mentioned signals, means for comparing said average signals from both scans and for deriving a difference signal, the plurality and amplitude of said difference signal indicating respectively which of said traces is longer and the amount of difference in the trace length, motor means responsive to said difference signal for rotating said scan generating means in a direction to equalize the length of said scans, means for generating a feed control signal, means responsive to the rotational position of said scan generating means and to said feed control signal to provide an X axis signal, $V_x$, and a Y axis signal, $V_y$, means for providing a reference potential, means for comparing the reference potential with the length signal of one of said scans and for generating another signal in response to differences therebetween, means for generating an X axis signal $V_{x'}$ and a Y axis signal $V_{y'}$ from said other signal, means for operating the X axis drive means in accordance with signals $V_x$ and $V_{x'}$, and means for operating the Y axis drive means in accordance with said signals $V_y$ and $V_{y'}$.

References Cited in the file of this patent

UNITED STATES PATENTS

| | | |
|---|---|---|
| 2,261,644 | Cockrell | Nov. 4, 1941 |
| 2,331,337 | Meyer | Oct. 12, 1943 |
| 2,627,055 | Calosi | Jan. 27, 1953 |
| 2,679,620 | Berry | May 25, 1954 |

FOREIGN PATENTS

| | | |
|---|---|---|
| 706,510 | Great Britain | Mar. 31, 1954 |